(12) United States Patent
Armetta (10) Patent No.: US 10,286,423 B1
(45) Date of Patent: May 14, 2019

(54) GRILL GRATE CLEANING TOOL AND HEAT SHIELD

(71) Applicant: David Armetta, Stamford, CT (US)

(72) Inventor: David Armetta, Stamford, CT (US)

( * ) Notice: Subject to any disclaimer, the term of this patent is extended or adjusted under 35 U.S.C. 154(b) by 13 days.

(21) Appl. No.: 15/089,519

(22) Filed: Apr. 2, 2016

Related U.S. Application Data

(63) Continuation-in-part of application No. 29/531,610, filed on Jun. 27, 2015.

(60) Provisional application No. 62/142,942, filed on Apr. 3, 2015.

(51) Int. Cl.
*B08B 1/00* (2006.01)
*B25G 1/10* (2006.01)

(52) U.S. Cl.
CPC .............. *B08B 1/005* (2013.01); *B25G 1/102* (2013.01)

(58) Field of Classification Search
None
See application file for complete search history.

(56) References Cited

U.S. PATENT DOCUMENTS

| | | | |
|---|---|---|---|
| 37,285 A | 1/1863 | Featherston | B27G 17/04 30/313 |
| 227,773 A | 5/1880 | Hartmann | A01F 11/06 30/121.5 |
| 475,275 A | 5/1892 | Fuller | A46B 15/0002 15/105 |
| 1,018,844 A | 2/1912 | Meyer | A47L 13/08 15/236.07 |
| 1,592,950 A | 7/1926 | McClain | A47L 13/08 15/236.01 |
| 5,613,431 A | 3/1997 | Tateno | A47J 17/02 30/114 |
| D421,497 S | 3/2000 | Wattiez | D24/133 |
| D439,980 S | 4/2001 | Reiley | D24/147 |
| D488,360 S | 4/2004 | Young | D7/673 |
| 6,796,032 B2 | 9/2004 | Horng | B26D 3/26 30/114 |
| 7,063,703 B2 | 6/2006 | Reo | A61B 17/16 600/567 |

(Continued)

OTHER PUBLICATIONS

Amazon.com: Excellent Matt Black OEM Replacement Front Center Grille Mesh, online, website copyright 2016, http://www.amazon.com/Excellent-Replacement-Center-Grille-2010-2014/dp/B016ICAGIE/ref=sr_1_197?ie=UTF8&qid=1456272137&sr=8-197&keywords=grill+tool, [site visited Feb. 23, 2016].

*Primary Examiner* — Eric W Golightly (74) *Attorney, Agent, or Firm* — Shifrin Patent Law; Dan Shifrin (57) ABSTRACT

A grill cleaning tool and a method for using the tool are provided. The tool comprises: a handle; an elongated main shaft having a first end and a second end secured to a first end of the handle; a first scraper extending perpendicular to the main shaft from opposite sides of the first end of the main shaft; and a second scraper spaced apart from the first scraper and extending perpendicular to the main shaft from opposite sides of the main shaft. A heat shield for a hand-held tool is also provided, comprising a handle having a grip section, and a concave-upward, bowl-shaped structure secured to a first end of the handle and positioned below the grip-section of the handle. The grill tool may also comprise a first cleaning surface on a top of the first scraper and a second cleaning surface on a bottom of the second scraper.

14 Claims, 5 Drawing Sheets

(56) References Cited

U.S. PATENT DOCUMENTS

| | | | | |
|---|---|---|---|---|
| 7,080,454 | B2 | 7/2006 | Holcomb | A47J 17/02 30/114 |
| D528,379 | S | 9/2006 | Dorion | D7/693 |
| D611,785 | S | 3/2010 | Spradling | D8/25 |
| D631,712 | S | 2/2011 | Hull | D7/673 |
| D648,992 | S | 11/2011 | Cotter | D7/693 |
| D702,513 | S | 4/2014 | Harris | D7/682 |
| 2002/0042964 | A1* | 4/2002 | Griffith | A47L 13/08 15/236.06 |
| 2002/0170134 | A1 | 11/2002 | Martin | A47L 13/08 15/236.01 |
| 2007/0245567 | A1 | 10/2007 | Laufer | A47J 43/288 30/123.3 |
| 2009/0255075 | A1* | 10/2009 | Carlson | A47L 13/34 15/104.94 |
| 2011/0187137 | A1* | 8/2011 | Wales | A47J 37/1271 294/7 |
| 2013/0233347 | A1* | 9/2013 | Wang | A47L 17/08 134/6 |

\* cited by examiner

GRILL GRATE CLEANING TOOL AND HEAT SHIELD

RELATED APPLICATION DATA

The present application is related to and claims the benefit of commonly-owned and co-pending U.S. application Ser. No. 62/142,942 entitled APPARATUS AND METHOD FOR SCRAPING AND CLEANING THE TOP-SIDE AND UNDER-SIDE OF A BARBEQUE GRILL GRATE, filed on Apr. 3, 2015, which application is incorporated herein by reference in its entirety. The present application is also a continuation-in-part of commonly-owned and co-pending U.S. Ser. No. 29/531,610, filed Jun. 27, 2015, which application is incorporated herein by reference in its entirety.

TECHNICAL FIELD

The present invention relates generally to cooking grills and, in particular, to a tool configured to clean the top and bottom surfaces of grill grates simultaneously.

BACKGROUND ART

Cooking food over an open fire is a tradition as old as mankind. Food preparation continues to evolve, and has in the last century become a much more common and refined activity due to available fuels and changing technology. These changes offer many new options in cooking techniques as well as offering more sophisticated and varied options in the preparation of many kinds of foods. The one generally consistent and essentially unchanged feature of outdoor cooking is a cooking surface, including a grill grate. The cooking surface has remained generally unchanged over the last century of open fire cooking, regardless of the type of grill or fuel used. The food to be cooked is generally placed on a flat horizontal grill grate that allows for heat and flame to reach the food, while supporting the food so it does not fall into the fire while cooking. Grill grates are usually manufactured using metal bars or rods arranged so that the food is supported while being exposed to the heat source. Commonly, a steel, alloy, or iron grill grate with bars or rods arranged in a parallel, spaced apart configuration suspended over the heat source is employed.

This arrangement allows the flames and heat to reach the food through the spaces between the bars or rods in the grill surface while also allowing the juices, cooking byproduct, and various food preparation liquids to fall through the grill grate. Normally, much of that by-product drops onto the heat supply and is eventually incinerated during the cooking process. However, during the cooking process, there is usually residual material left on the top surface and the underside and sides of the grill grate.

There are various cleaning apparatus available to remove the residual material from the top of the grill grate bars after the cooked food is removed. These include brushes, scrapers, and abrasive tools. These tools are usually used immediately before the next meal is cooked, although they may also be employed immediately after the current meal is finished being cooked. One problem, however, is that after use they tend to leave residual buildup still clinging to the underside and side surfaces of the grill grate. Although this leftover material is not normally in direct contact with current food being cooked, it is still there, residing between the heat source and the cooking surface. If left on the underside of the grill grate bars, this material can decay and leave dangerous bacteria near to the grill grate top surface. Later, when the next meal is being cooked, this residual material is subject to the intense heat of cooking and often begins to burn, smoke and foul the flavor of the fresh food cooking on the top surface of the grill. It generally burns due to the proximity of the heat source directly under this residual material. This can cause uncontrolled flames or even a fire within the grill's enclosure. It can also burn and ruin the underside of the fresh food cooking on the grill grate itself.

SUMMARY OF THE INVENTION

Embodiments of the present invention provide a grill cleaning tool, comprising: a handle; an elongated main shaft having a first end and a second end secured to a first end of the handle; a first scraper extending perpendicular to the main shaft from opposite sides of the first end of the main shaft; and a second scraper spaced apart from the first scraper and extending perpendicular to the main shaft from opposite sides of the main shaft. The grill tool may also comprise a first cleaning surface of a top of the first scraper and a second cleaning surface on a bottom of the second scraper.

Embodiments of the present invention also provide method of cleaning spaced apart bars of a grill grate, comprising:

a) holding a grill cleaning tool in a hand, the tool comprising: a handle; an elongated main shaft having a first end and a second end secured to a first end of the handle; a first scraper extending perpendicular to the main shaft from opposite sides of the first end of the main shaft; and a second scraper spaced apart from the first scraper and extending perpendicular to the main shaft from opposite sides of the main shaft.

b) turning the tool such that the first and second scrapers are parallel to the grill bars;

c) inserting the first scraper through an opening between the first and second adjacent grate bars;

d) turning the tool such that the first and second scrapers are perpendicular to the grate bars;

e) lowering the handle of the tool such that a bottom cleaning surface of the first scraper contacts the bottom surface of the first and second grate bars and a top cleaning surface of the second scraper contacts the top surface of the first and second grate bars;

f) moving the tool back and forth parallel to the grill grates, whereby debris is removed from the top and bottom surfaces of the first and second grate bars simultaneously;

g) when the top and bottom surfaces of the first and second grill grates are clean, turning the tool such that the first and second scrapers are parallel to the grate bars;

h) removing the first scraper through the opening between the first and second adjacent grate bars; and i) repeating steps b)-h) to clean additional grill grates.

Embodiments of the present invention further provide a heat shield for a hand-held tool, comprising a handle having a grip section, and a bowl-shaped structure secured to a first end of the handle and positioned below the grip-section of the handle.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
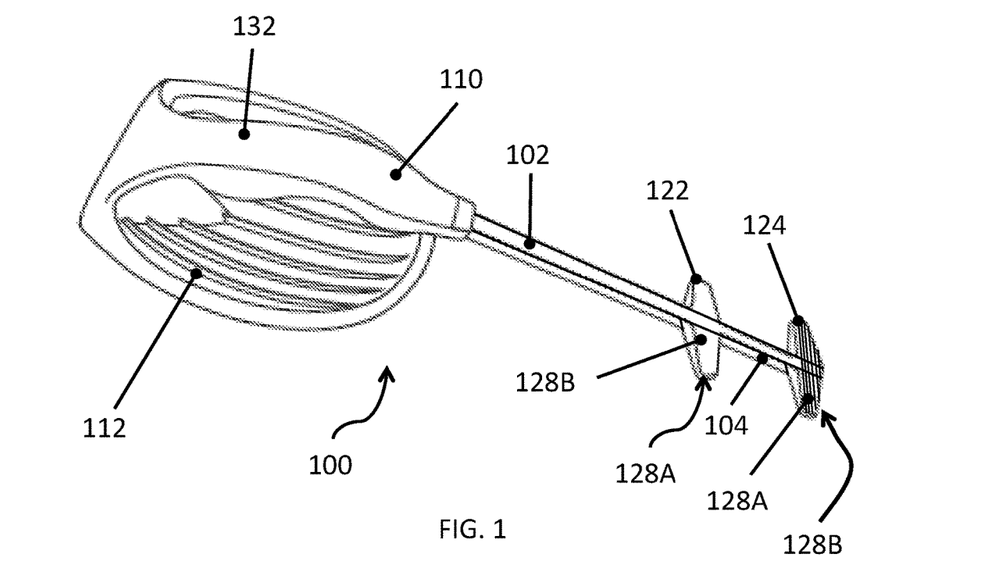
FIG. 1 is a perspective view of an embodiment of a grill grate cleaning tool of the present invention.

Various embodiments of the present invention provide a tool 100 that is configured to remove residual material from the top, sides, and underside of a barbeque grill grate without moving or changing the grill grate within the grill enclosure. FIG. 1 is a perspective view of one embodiment of the grill grate cleaning tool 100. The tool 100 includes a main shaft 102 with a lower section 104, a handle 110 secured at one end to an upper end of the main shaft 102, an upper wing-shaped scraper 122 extending substantially perpendicularly from both sides of the main shaft 102, and a lower wing-shaped scraper 124 spaced apart from the upper scraper 122 and extending substantially perpendicularly from both sides of the lower section 104. The top and bottom surfaces of the scrapers 122, 124 are configured to remove debris from the surfaces of grill grates, as described in more detail below. In the embodiment illustrated in FIG. 1, the bottom of the upper scraper 122 and the top of the lower scraper 124 each have a cleaning surface 128A while the top of the upper scraper 122 and the bottom of the lower scraper 124 each have a plain surface 128B.

The handle 110 may optionally include a heat shield 112 secured to the handle 110 opposite the end to which the handle 102 is secured. The heat shield 112 is positioned below the grip section of the handle 110 to protect the user's hand and allow the tool to be used while the grill grate is still hot. The top of the handle 110 may include a graphic or label 132.

Figure 2:
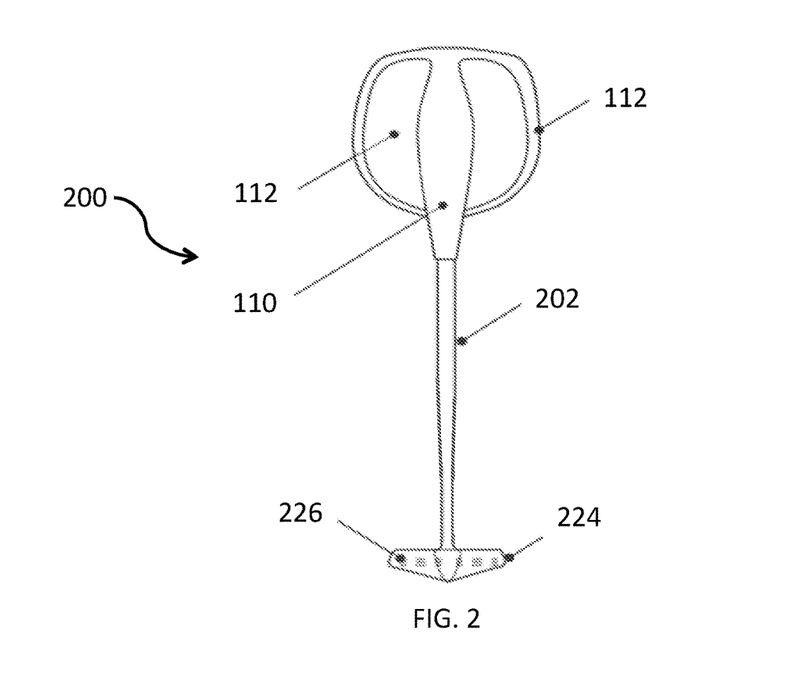
FIG. 2 is a top view of another embodiment of a grill grate cleaning tool of the present invention.

FIG. 2 illustrates an embodiment of a grill cleaning tool 200 having a single scraper 224 extending substantially perpendicular from the lower end of a shaft 202. The upper end of the shaft 202 is secured to the handle 110 with its optional heat shield 112. The top and bottom of the scraper 224 both have surfaces 226 configured to remove debris from the surfaces of grill grates, as described in more detail below.

Figure 3:
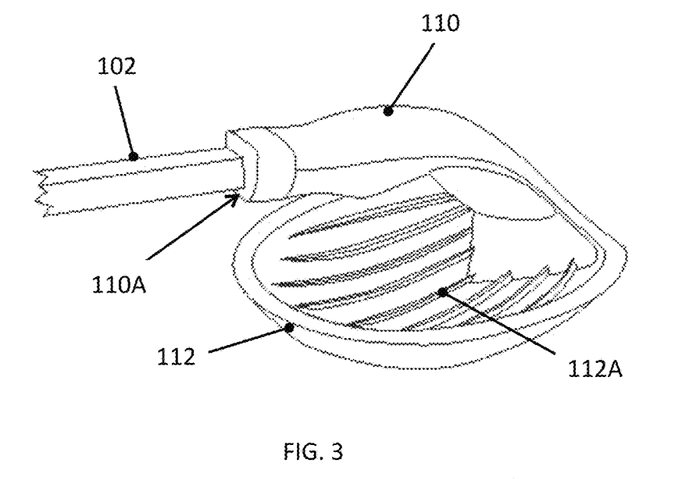
FIG. 3 is a close-up perspective view of the handle and heat shield of the cleaning tool of FIG. 1.

FIG. 3 is a close-up view of the handle 110 and heat shield 112 of the tool 100. The handle 110 includes an opening 110A into which the main shaft 102 is inserted and secured. In one embodiment, illustrated in FIG. 4, the upper portion 106 of the shaft 102 is flexible or is pre-bent to follow the contour of the handle 110 and has a rib-like surface to firmly engage the inside surface of the opening 110A. In the FIGS., the heat shield 112 is bowl-shaped, concave-upward, and wide enough so that the user's hand is fully protected when holding the handle 110. However, the heat shield 112 may be formed in any other shape, including, rectangular, flat, or concave-downward, among others. It will be appreciated that the heat shield 112 may be secured to the handle of any of a variety of hand-held tools used where heat is present and it is important to protect the user's hand.

Figures 5, 6:
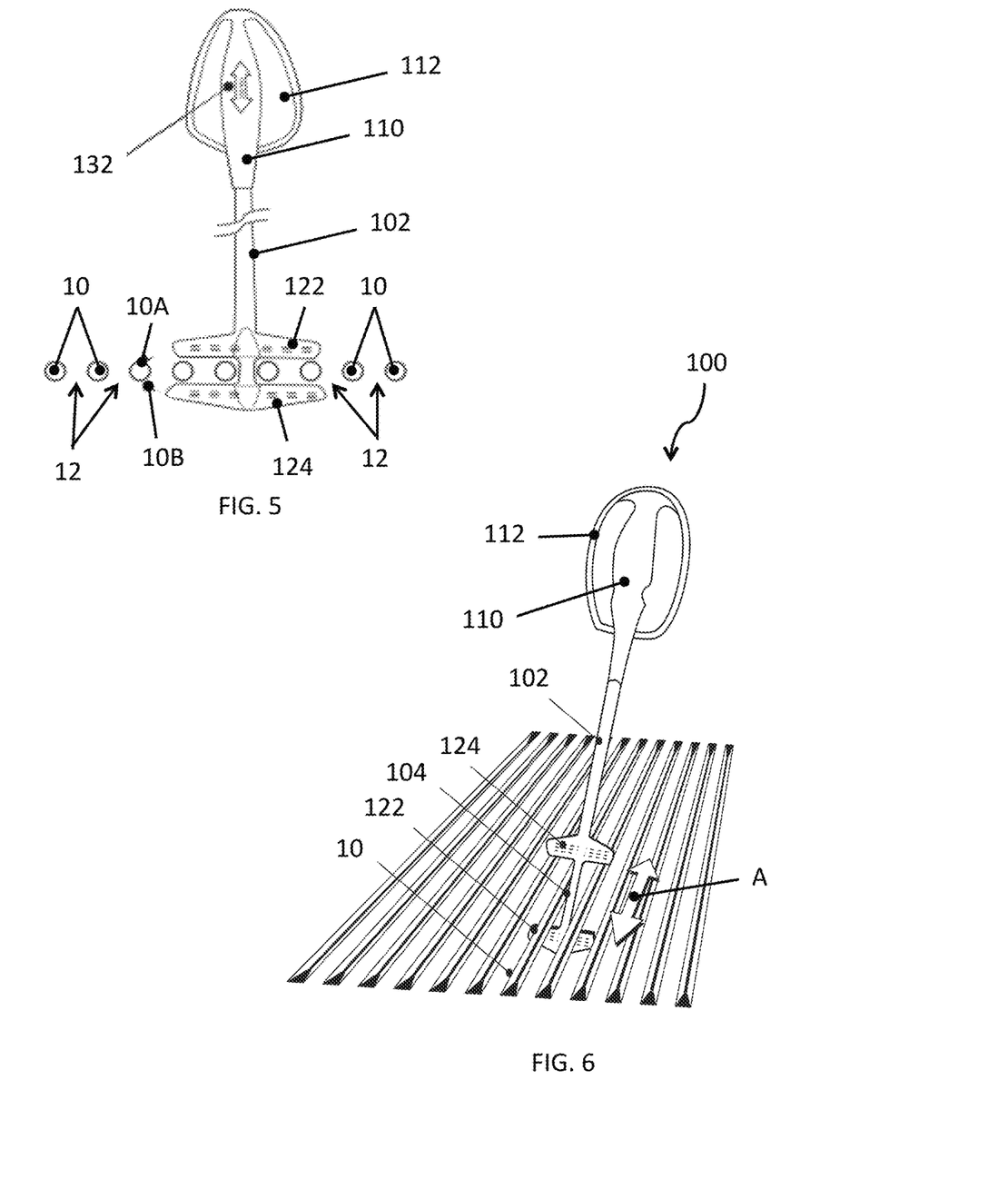
FIG. 5 is a front view of the cleaning tool of FIG. 1 in use.
FIG. 6 is a front perspective view of the cleaning tool of FIG. 1 in use.

As illustrated in FIGS. 5 and 6, the tool 100 allows the user to clean the top 10A and underside 10B of the grill grate bars 10 from above the grate 10 by first turning the tool 100 so that the scrapers 122, 124 are substantially parallel to the grate bars 10, inserting the lower scraper 124 through a slot 12 between two adjacent grate bars, then turning the tool 100 so that the scrapers 122, 124 are substantially perpendicular to the grate bars 10. The bottom cleaning surface 128A of the upper scraper 122 and the top cleaning surface 128A of the lower scraper 124 contact the top 10A and underside 10B surfaces, respectively, of the grill grate bars 10. The tool may then be moved back and forth in the direction indicated by the arrow 'A' to clean the surfaces 10A, 10B. Downward and upward pressure by the scrapers 122, 124, respectively, against the surfaces 10A, 10B may be increased or decreased by changing the angle of the shaft 102 of the tool 100 relative to the grill grate bars 10. The pressure facilitates the removal of the residual food materials left behind on the top and bottom surfaces 10A, 10B after cooking on the grill grate bars 10. The single scraper 224 of the cleaning tool 200 (FIG. 10) may be used to clean the top or bottom surfaces of the grate bars separately.

While FIG. 6 illustrates the scrapers 122, 124 as contacting just two adjacent grate bars 10, the scrapers 122, 124 may be made wide enough to clean any number of adjacent grate bars 10 simultaneously (see FIG. 5). The wider the scrapers 122, 124 are, the larger the area that can be cleaned with each swipe), limited only by the length of the grill grate bars 10 and other practical considerations. When one section of grate bars 10 has been cleaned, the lower scraper 122 may be removed from below the grates 10 by reversing the insertion process. The tool 100 may then be used to clean another set of the grill grate bars 10. As previously noted, because the heat shield 112 protects the user's hand, it is not necessary to wait until the gill has cooled before cleaning the grate bars 10.

Figure 7:
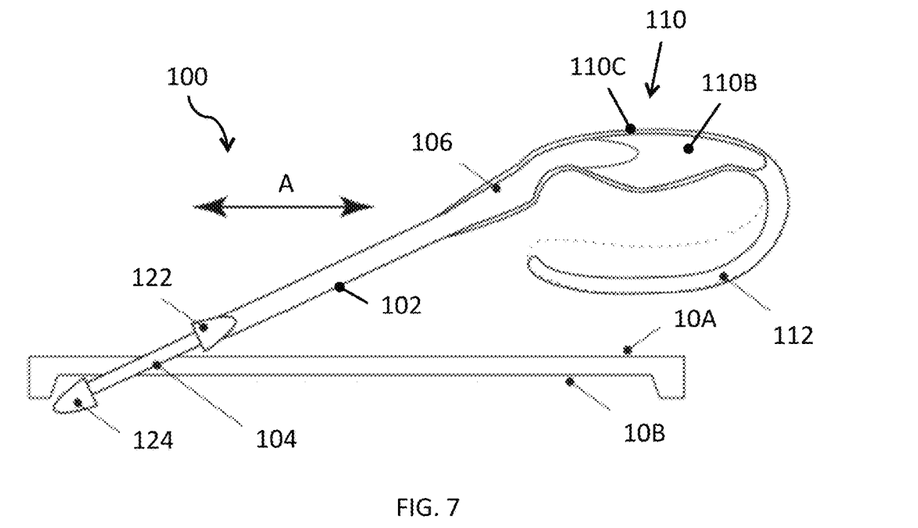
FIG. 7 is a side view of an embodiment of a cleaning tool of the present invention with chisel-like scrapers.
Figure 8:
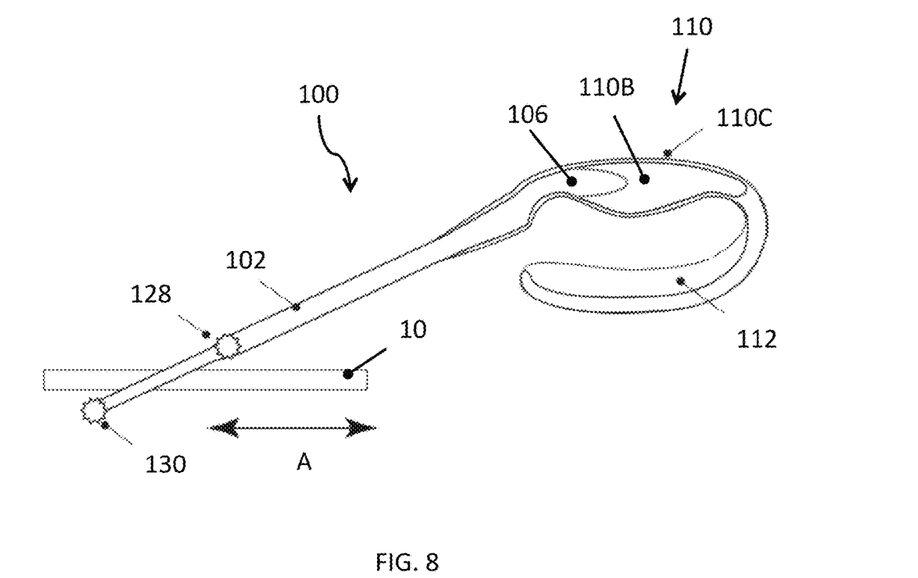
FIG. 8 is a side view of another embodiment of a cleaning tool of the present invention with round star-shaped scrapers.

The scrapers 122, 124 are contoured and have surfaces that facilitate the cleaning process. For example, as described above, the bottom of the upper scraper 122 and the top of the lower scraper 124 may each have a cleaning surface 128A while the top of the upper scraper 122 and the bottom of the lower scraper 124 may each have a plain surface 128B (FIG. 1). In another embodiment the scraper surfaces may include sharp chisel-like structures, such as a blade, as shown in the side view of FIG. 7. In another example, the surfaces may be abrasive, with a gear-like cross-section, as shown in the side view of FIG. 8. After use, the scrapers 122, 124, 324 may be cleaned and reused.

Figure 9:
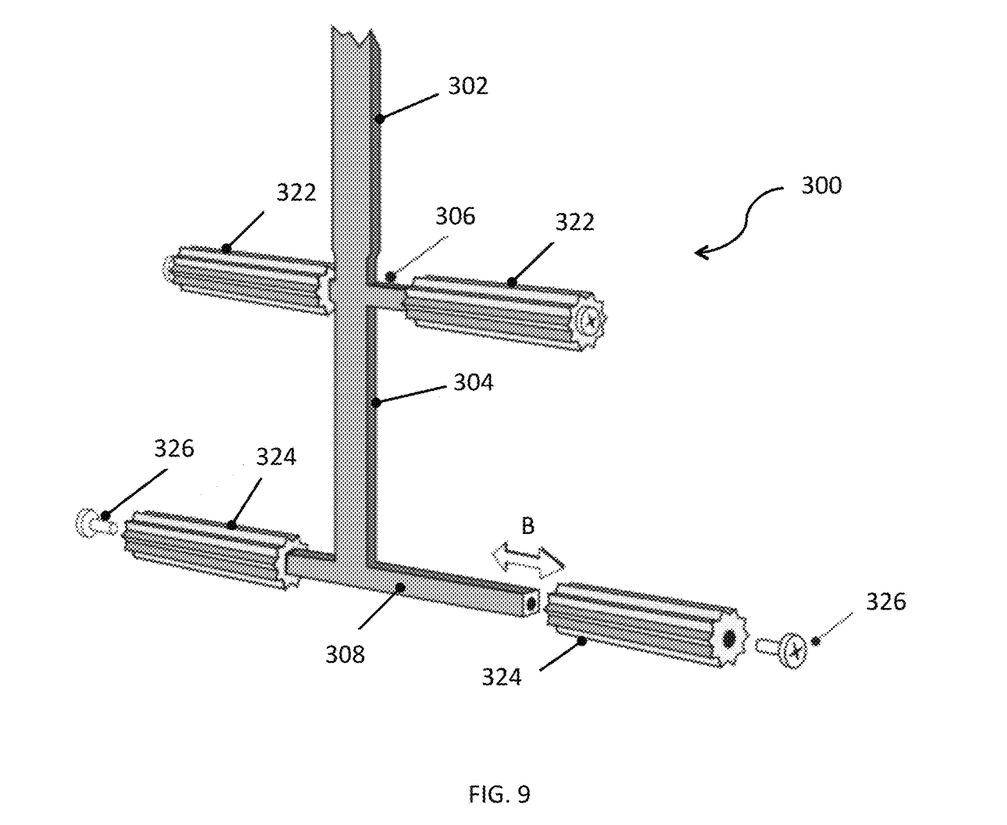
FIG. 9 is a perspective view of the lower portion of another embodiment of a cleaning tool of the present invention with removable scrapers.

The scrapers 122, 124 may be molded, cast, or otherwise permanently secured to the shaft 102 or may be removable, as illustrated in the embodiment of FIG. 9. The tool 300 again has main shaft 302 and lower section 304 and also has spaced apart upper and lower scraper shafts 306, 308, respectively, extending perpendicular to the shaft 302 and section 304. The upper and lower scrapers 322, 324 slip onto the shafts 306, 308 and are removably secured with fasteners 326, such as bolts. Scrapers with different surfaces, as described above, may be easily interchanged, such as when excessive food has accumulated and hardened onto the grate surfaces and a more aggressive cleaning is necessary. Scrapers may also be changed when the scraper surfaces have worn down and no longer perform adequate cleaning.

Figure 4:
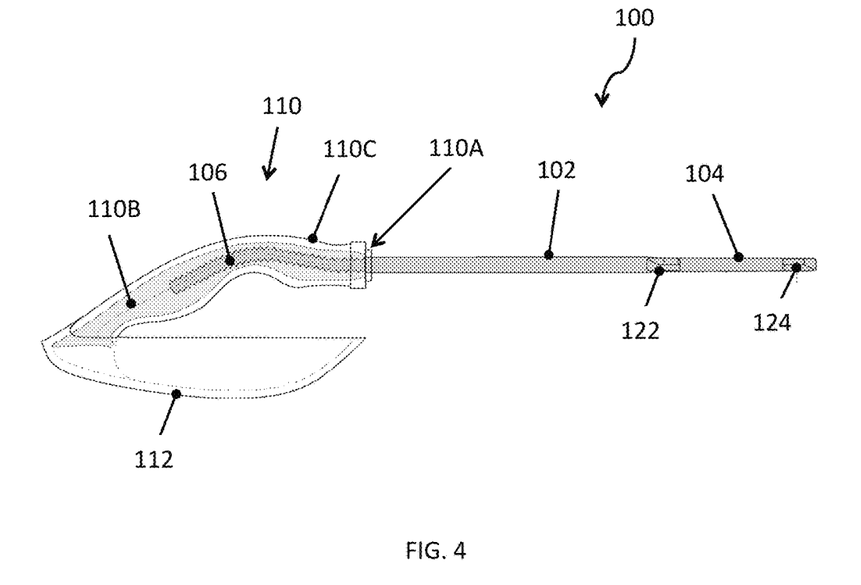
FIG. 4 is a cross-sectional view of the cleaning tool of FIG. 1.

The following description applies equally to the embodiments of FIGS. 1-8 and FIG. 9 although the corresponding components of FIG. 9 will not be separately referenced. The main shaft 102, may be formed from a stiff material, such as steel or other like material capable of withstanding the high heat of a grill. The upper section 106 of the main shaft 102 may either be flexible, as noted above, or pre-bent to follow the contour to the opening 110A in the handle 110. The handle 110 may be constructed with a nylon core 110B to firmly hold the upper portion 106 of the shaft 102 within the opening 110A and a heat-resistant silicone cover 110C molded over the core (FIG. 4). The heat shield 112 may also be formed from nylon, ABS, or other like material molded over the handle covered again with silicone. The heat shield 112 may include raised longitudinal ribs 112A (FIG. 3), such as along the concave inner surface, for additional stiffness and stability.

The following dimensions of various components of the scraper tools 100, 200 are approximate and merely representative of the embodiments described. They are not critical to the function of the present invention and are not intended to be limiting.

The heat shield 112 may be 4½ inches wide and 6 inches long. The length of the main shaft 102 with the lower section 104 may be 8½ inches long and the upper section 106 may be an additional 3½ inches long. The lower section 104 may be 1⅞ inches long. The main shaft 102 may be ⅜ inches wide and thick (with a rectangular or round cross-section), tapering to ¼ inches wide and thick in the lower section 104. The scrapers 122, 124 may be 2 inches wide and ⅜ inches thick at their centers tapering to ⅛ inch at their ends to enable them to fit through the spaces between adjacent grill grates.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A grill cleaning tool, comprising:
a handle;
an elongated main shaft having a first end and a second end secured to a first end of the handle;
a first scraper extending substantially perpendicular from opposite sides of the first end of the main shaft in a first plane that includes the main shaft; and
a second scraper spaced apart from the first scraper and extending perpendicular to the main shaft from opposite sides of the main shaft in the first plane.

2. The grill tool of claim 1, wherein the second end of the main shaft extends into, and is secured within, an opening in the first end of the handle.

3. The grill tool of claim 1, wherein the first and second scrapers are removable from the main shaft.

4. The grill tool of claim 3, further comprising:
a first scraper shaft extending substantially perpendicular from opposite sides of the main shaft and onto which the first scraper is securable; and
a second scraper shaft extending perpendicular to the main shaft from opposite sides of the main shaft and onto which the second scraper is securable.

5. The grill tool of claim 1, wherein a back edge of the first scraper and a front edge of the second scraper each comprise a blade, whereby a bottom surface of one or more adjacent grates of a grill is cleanable by the blade of the first scraper and a top surface of the one or more adjacent grates is cleanable simultaneously by the blade of the second scraper.

6. The grill tool of claim 1, wherein the first and second scrapers have a gear-shaped cross-section.

7. The grill tool of claim 1, wherein the first and second scrapers each comprise an abrasive surface.

8. The grill tool of claim 1, further comprising a heat shield positioned below the handle and extending only from a second end of the handle, opposite the first end.

9. The grill tool of claim 8, wherein the heat shield comprises a bowl-shaped structure molded as part of the handle.

10. The grill tool of claim 1, wherein:
the first and second scrapers each have a top surface and a bottom surface;
the bottom surface of the first scraper cannot comprise a cleaning surface; and
the top surface of the second scraper cannot comprise a cleaning surface;
whereby, a bottom surface of one or more adjacent grates of a grill is cleanable by the top surface of the first scraper and a top surface of the one or more adjacent grates is cleanable simultaneously by the bottom surface of the second scraper.

11. The grill tool of claim 1, wherein the handle comprises:
an inner core of a first material; and
an outer cover of a second material different from the first material, the outer cover surrounding the inner core.

12. The grill tool of claim 11, wherein:
the inner core of the handle comprises nylon; and
the outer cover of the handle comprises silicone molded over the inner core.

13. A grill cleaning tool, comprising:
a handle;
an elongated main shaft having a first end and a second end secured to a first end of the handle;
a first scraper extending substantially perpendicular from opposite sides of the first end of the main shaft in a first plane that includes the main shaft;
wherein a back edge of the first scraper comprises a blade, whereby a bottom surface of one or more adjacent grates of a grill is cleanable by the blade of the first scraper; and
a second scraper spaced apart from the first scraper and extending perpendicular to the main shaft from opposite sides of the main shaft in the first plane, the second scraper having a front edge comprising a blade, whereby the bottom surface of the one or more adjacent grates is cleanable by the blade of the first scraper and a top surface of the one or more adjacent grates is cleanable simultaneously by the blade of the second scraper.

14. A grill cleaning tool, comprising:
a handle;

an elongated main shaft having a first end and a second end secured to a first end of the handle;

a first scraper extending substantially perpendicular from opposite sides of the first end of the main shaft in a first plane that includes the main shaft, the first scraper comprising a top surface and a bottom surface, the top surface comprising a cleaning surface, whereby a bottom surface of one or more adjacent grates of a grill is cleanable by the top surface of the first scraper; and a second scraper spaced apart from the first scraper and extending perpendicular to the main shaft from opposite sides of the main shaft in the first plane, the second scraper comprising a top surface and a bottom surface, the bottom surface comprising a cleaning surface, whereby a top surface of the one or more adjacent grates of a grill is cleanable by the bottom surface of the second scraper.

* * * * *